United States Patent
Li et al.

(10) Patent No.: US 12,287,721 B2
(45) Date of Patent: Apr. 29, 2025

(54) STORAGE MANAGEMENT AND USAGE OPTIMIZATION USING WORKLOAD TRENDS

(71) Applicant: International Business Machines Corporation, Armonk, NY (US)

(72) Inventors: Yan Li, Beijing (CN); Run Qian Bj Chen, Beijing (CN); Chen Guang Zhao, Beijing (CN); Qin Qin Zhou, Beijing (CN); Guang Han Sui, Beijing (CN); Jing Li, Beijing (CN); You Bing Li, Beijing (CN); Yu Xiang Chen, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 17/585,695

(22) Filed: Jan. 27, 2022

(65) Prior Publication Data

US 2023/0236946 A1 Jul. 27, 2023

(51) Int. Cl.
*G06F 11/34* (2006.01)
*G06F 9/50* (2006.01)

(52) U.S. Cl.
CPC .......... *G06F 11/3442* (2013.01); *G06F 9/505* (2013.01); *G06F 9/5077* (2013.01)

(58) Field of Classification Search
CPC ..... G06F 11/3442; G06F 9/505; G06F 9/5077
See application file for complete search history.

(56) References Cited

U.S. PATENT DOCUMENTS

| | | | |
|---|---|---|---|
| 8,352,608 B1 * | 1/2013 | Keagy | G06F 9/45558 709/225 |
| 8,732,413 B2 | 5/2014 | Moon | |
| 8,914,515 B2 | 12/2014 | Alapati | |
| 9,798,827 B2 | 10/2017 | Liang | |

(Continued)

OTHER PUBLICATIONS

"Configuring kubelet Garbage Collection", downloaded from the Internet Jun. 10, 2020, 5 pages, <https://kubernetes.io/docs/concepts/cluster-administration/kubelet-garbage-collection/#image-collection>.

(Continued)

*Primary Examiner* — Benjamin C Wu
(74) *Attorney, Agent, or Firm* — Daniel M. Yeates

(57) ABSTRACT

Solutions preparing container images and data for container workloads prior to start times of workloads predicted through workload trend analysis. Local storage space on the node is managed based on workload trends, optimizing local storage of image files without requiring frequent reloading and/or deletion of image files, avoiding network intensive I/O operations when pulling images to local storage by workload scheduling systems. Systems perform collection of historical data including image and workload properties; analyze historical data for workload trends, including predicted start times, image files needed, number of nodes and types of nodes. Based on predicted future workload start times, nodes are selected from an ordered list of node requirements and workload properties. Selected nodes' local storage is managed using predicted future start times of workloads, to avoid removing image files having sooner start times, while removing (as needed) images files predictively utilized for workloads further into the future.

20 Claims, 11 Drawing Sheets

(56) References Cited

U.S. PATENT DOCUMENTS

| | | | |
|---|---|---|---|
| 10,313,472 | B2 | 6/2019 | Westberg |
| 2008/0271038 | A1 | 10/2008 | Rolia |
| 2012/0324092 | A1 | 12/2012 | Brown |
| 2014/0215495 | A1* | 7/2014 | Erich .................. G06F 11/3438 719/318 |
| 2017/0118610 | A1* | 4/2017 | Schieman ........... G06F 11/3466 |
| 2017/0351546 | A1* | 12/2017 | Habak ..................... G06F 9/505 |
| 2018/0300653 | A1* | 10/2018 | Srinivasan .............. H04L 67/06 |
| 2019/0363962 | A1* | 11/2019 | Cimino ................. G06F 9/4843 |
| 2020/0241917 | A1* | 7/2020 | Chen ..................... G06F 9/3836 |
| 2021/0200593 | A1* | 7/2021 | Allyn .................... G06F 9/5022 |
| 2022/0206873 | A1* | 6/2022 | He ........................ G06F 9/4881 |
| 2022/0283724 | A1* | 9/2022 | Malamut ............... G06F 3/0619 |

OTHER PUBLICATIONS

"Disk utilization in Docker for Mac", downloaded from the Internet on Aug. 5, 2021, 3 pages, <https://docs.docker.com/docker-for-mac/space/>.

"High Performance Innovation | Altair PBS Works", downloaded from the Internet on Oct. 6, 2021, 9 pages, <https://www.altair.com/pbs-works/>.

"Method and Apparatus of Prediction Based Dynamic Workload Mediator", An IP.com Prior Art Database Technical Disclosure, Authors et al.: Disclosed Anonymously, IP.com No. IPCOM000260647D, IP.com Electronic Publication Date: Dec. 13, 2019, 3 pages.

"Monitoring the disk space used by IBM Workload Scheduler", IBM Workload Automation, Version 9.5, downloaded from the Internet on Jun. 9, 2020, 4 pages, <https://www.ibm.com/support/knowledgecenter/SSGSPN_9.5.0/com.ibm.tivoli.itws.doc_9.5/distr/src_ad/awsadedwa4diskspace.htm>.

"Slurm Workload Manager—Documentation", SchedMD, Last modified Aug. 20, 2021, 4 pages, <https://slurm.schedmd.com/>.

"What Should I Do If Image Re-pull Fails?", Jun. 1, 2020, Huawei Cloud, 4 pages, <https://support.huaweicloud.com/intl/en-us/cce_faq/cce_faq_00015.html>.

Chen et al., "PSO-GA-Based Resource Allocation Strategy for Cloud-Based Software Services With Workload-Time Windows", IEEE Access, vol. 8, 2020, date of publication Aug. 18, 2020, date of current version Aug. 28, 2020, Digital Object Identifier 10.1109/ACCESS.2020.3017643, 11 pages.

Gmach et al., "Workload Analysis and Demand Prediction of Enterprise Data Center Applications", 2007 IEEE 10th International Symposium on Workload Characterization, Sep. 29, 2007, 10 pages.

Kim et al., "Forecasting Cloud Application Workloads with CloudInsight for Predictive Resource Management", IEEE Transactions on Cloud Computing, 2020, 16 pages.

Lu et al., "RVLBPNN: A Workload Forecasting Model for Smart Cloud Computing", Research Article, Hindawi Publishing Corporation, Scientific Programming, vol. 2016, Article ID 5635673, 9 pages, http://dx.doi.org/10.1155/2016/5635673, Received Jul. 28, 2016, Accepted Sep. 19, 2016.

Mell et al., "The NIST Definition of Cloud Computing", Recommendations of the National Institute of Standards and Technology, Special Publication 800-145, Sep. 2011, 7 pages.

Noel et al., "Towards Self-Managing Cloud Storage with Reinforcement Learning", 2019 IEEE International Conference on Cloud Engineering (IC2E), 10.1109/IC2E.2019.000-9, 11 pages.

\* cited by examiner

STORAGE MANAGEMENT AND USAGE OPTIMIZATION USING WORKLOAD TRENDS

BACKGROUND

The present disclosure relates generally to the field of cloud platforms and containerized workloads, and more specifically, the optimization of image retrieval and storage based on predicted workload trends.

Container platforms operating within cloud computing environments have been widely adopted to build, share and run applications. A container is a standard unit of software that packages the software code and all of the dependencies of the software within a self-contained package, allowing the application to run quickly and reliably in a plurality of computing environments. Multiple containers can run on the same infrastructure and share the same operating system (OS) kernel with other containers, with each running as an isolated process in user space. Containers are built from images which become containers at runtime. The container image is a lightweight, standalone executable package of software used to run an application and can include code, runtime, system tools, libraries and settings. Containers isolate the software from the surrounding environment, ensuring that the software runs in the same manner and uniformly across environments, regardless of the infrastructure running the container.

SUMMARY

Embodiments of the present disclosure relate to a computer-implemented method, an associated computer system and computer program products for managing and optimizing container image storage. The computer-implemented method comprising: inputting, by a processor, image and data information of a historical workload record into a machine learning model configured to predict future workload requirements based on workload trends of the historical workload record; learning, by the processor, image and data requirement trends of the historical workload record using the machine learning model; outputting, by the processor, predicted image and data requirements for future workloads based on the image and data requirement trends learned from the machine learning model; engaging, by the processor, a checking cycle wherein a daemon process checks whether an image file for an upcoming future workload as predicted by the predicted image and data requirements needs to be downloaded to one or more nodes prior to running the upcoming future workload; and triggering, by the processor, a pulling task upon a current local time plus a max recorded download time of the image file plus a pre-defined buffer time is less than or equal to a predicted start time of the upcoming future workload.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
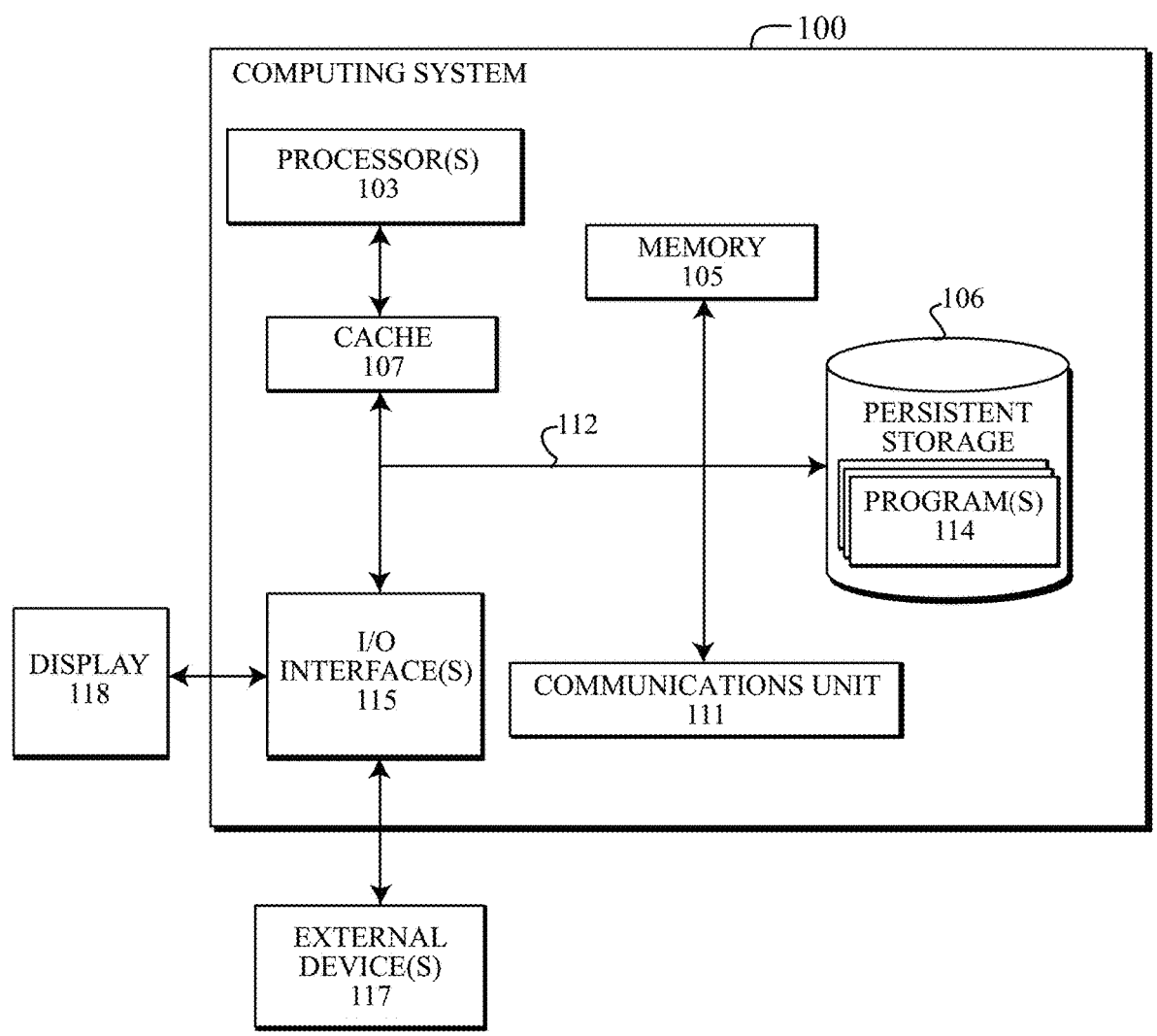
FIG. 1 depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

OVERVIEW

Container systems operating in a cloud environment are widely used to setup different types of computing environments to run a plurality of different workloads. For example, container systems can be used by batch systems to setup a processing environment to run batch workloads and/or on-demand workloads. In order to create and deliver different applications and services within the desired environment, many kinds of container images may be needed by the container systems to provide the different workloads to users. Images for the workloads are typically stored on a local storage device such as a local disk or other persistent storage 106 before the workload can begin. Unfortunately, in order to store and maintain a plurality of different container images locally by the container system, large amounts of local storage space may be needed, yet unavailable in a space limited environment such as the container system running in a cloud environment. Typical image sizes being stored locally to the container system may be as small as 1 gigabyte (GB) to 2 GB and in some instances may be 10 GB or more in size. In a typical cloud environment, the container system may only have 20-40 GB of space available for storing container images. Often, storing only a couple of different images needed to run different workloads may cause the container system to quickly fill the maximum amount of available storage space within the local storage device.

Embodiments of the present disclosure recognize that container systems running in a cloud environment may need to regularly delete and replace locally stored container images over time in order to balance the amount of available space of the container system with the size and number of container images needed to run active workloads. As a result, container systems may repeatedly need to pull container images from an external location such as an image library, repository, or registry, before a workload is needed by the container system. Pulling images from the external location can give rise to multiple problems. First, in situations where a container image is being pulled right before a scheduled workload is about to start, the container system runs the risk of the workload failing due to a lack of local storage space and thus being unable to retrieve and store the image that is larger than the remaining storage space before the scheduled start of the workload. Secondly, when low amounts of resources are available and a container system must make space for images, a large container image being retrieved from a registry before the workload starts may require a long time to retrieve the image having a large files size and the container system may be unable to fully retrieve the entire image before the workload is scheduled to start.

Mechanisms for resolving issues that arise from having to repeatedly pull container images can include scheduling workloads to computing nodes that already have the requested image stored locally and/or to run an existing disk optimization software on the node tasked with running the workload. Such solutions suffer from drawbacks that may still be problematic for the nodes tasked with running a container image. For example, if a scheduler of a container system only targets nodes locally storing the required image, if the nodes having the target image are busy or not powerful enough to run the new workload, other nodes will still need to pull the image onto one or more different computing nodes. Moreover, existing optimization tools do not optimize local storage based on predicted image file usage and are not concerned whether or not some image files may be used sooner than others and/or whether stored image files may not be used at all in the future. As a result, nodes may still be required to frequently delete image files and pull the image files again. Therefore, there is a need for management and optimization of local storage devices of computing nodes that are able to intelligently predict image file usage based on workload trends of the container system, anticipate upcoming workload requirements by automatically retrieving container images before workloads are scheduled to run and clean up images stored on the local storage of nodes which are not predicted to be used for an extended period of time and/or may not be used again by the node.

Embodiments of the present disclosure leverage machine learning and workload trend analysis to predict future image and data usage needs of container system nodes and prioritize disk utilization of local storage by the node, in order to remove image files least likely to be used again by the node in the near future. Prioritization of disk usage based on workload trends save space for future workloads that are predicted to be more likely to run as a container within a more immediate period of time. Embodiments of the present disclosure manage the optimization of container image retrieval and storage by: collecting historical workload records of the container system, including image and data information; analyzing workload trends of the container system using the collected data inputted into machine learning models based on the Naïve Bayes algorithm; predicting which kinds of images and data will be requested by future workloads as a function of the predicted trends; and if images need to be pulled into local storage for a future workload, triggering a pulling task. During a pulling task, a plurality of task and node properties can be used to identify nodes that may satisfy requirements for running the future workload. For example, properties may include the required image, the kind of node, the number of required nodes, a timing constraint for the workload and network input and output (network I/O) requirements. The resulting nodes that meet the task and node properties for the future workloads can be ordered by CPU, memory, and/or free local disk space. Each node may be examined sequentially, in order, based on the future workload properties to determine whether or not the node has the image already saved in storage, whether free space is greater than the image size and/or the network I/O is satisfied. Nodes having the image already in storage can be selected for running the future workload, while nodes having enough free space and/or network I/O can pull the image. Upon successfully pulling the image, the node can be assigned to run the future workload as scheduled by the container system.

In situations where the nodes being examined during the pulling task for whether the node has excess free space beyond the space required by the image size, and the node does not have a requisite amount of space to store the image file locally, embodiments of the present disclosure may trigger a disk utilization management process to free up additional space on the node. During the disk utilization management process, the management process can check which workloads are related to each image file being pulled to local storage based on mappings of a database which may map the workload and image file relationship. The image files can be ordered in a list according to how soon each related workload will be run in the future (i.e., predicted start time) based on the workload trend predictions of the machine learning models. Image files known for being used or related to workloads predicted not to be run again and/or run last according to the ordered list of images, can be removed from the node's local storage. The disk utilization management process can iteratively check whether or not enough free space is available after deletion of the locally store image file with the furthest predicted start time. If enough free space is now available to store the image file for upcoming future workload, the disk utilization management process can end. Otherwise, if not enough free space has been created following the deletion of the least likely used locally stored image file, the last image file in the updated list of locally store image files can be deleted, until the appropriate amount of storage space is made available to pull the image file for the upcoming future workload. Upon successful completion of the disk utilization management process to create enough local storage space, the node can pull the requisite image file for the upcoming workload from a registry, image library, repository and/or other external location, onto the node's local storage.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, and virtualized computer systems, including systems with container-oriented architecture, microservice-oriented architecture. For example, computing system 100 can take the form desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more clusters, pods or containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or accessed by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 2:
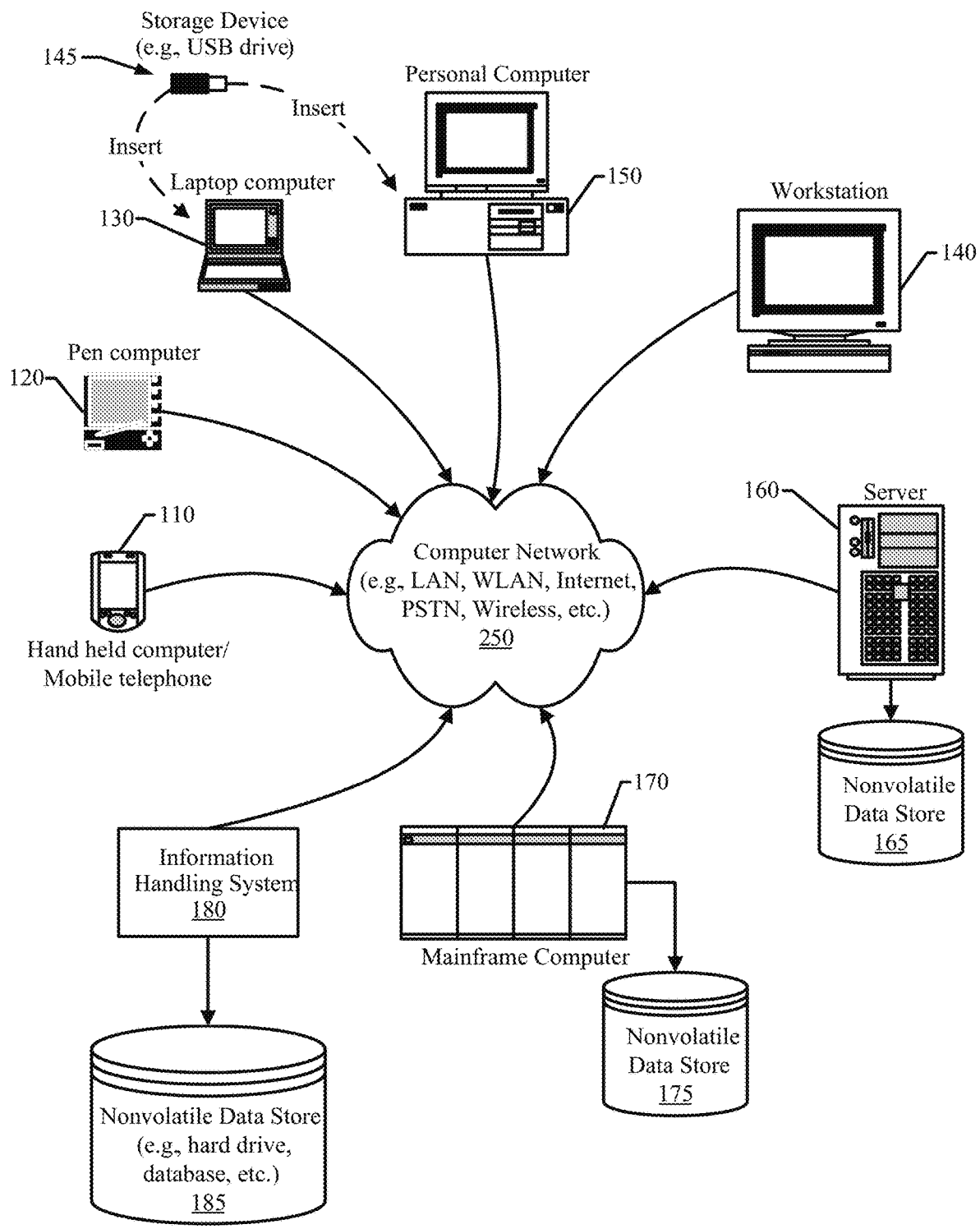
FIG. 2 depicts a block diagram illustrating an extension of the computing system environment of FIG. 1, wherein the computing systems are configured to operate in a network environment and perform methods described herein in accordance with the present disclosure.

FIG. 2 illustrates an extension of the computing system 100 environment shown in FIG. 1 depicting that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 2 are represented by information handling system 180.

Many of the computing systems can include nonvolatile data stores, such as hard drives and/or nonvolatile memory. The embodiment of the information handling system shown in FIG. 2 includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
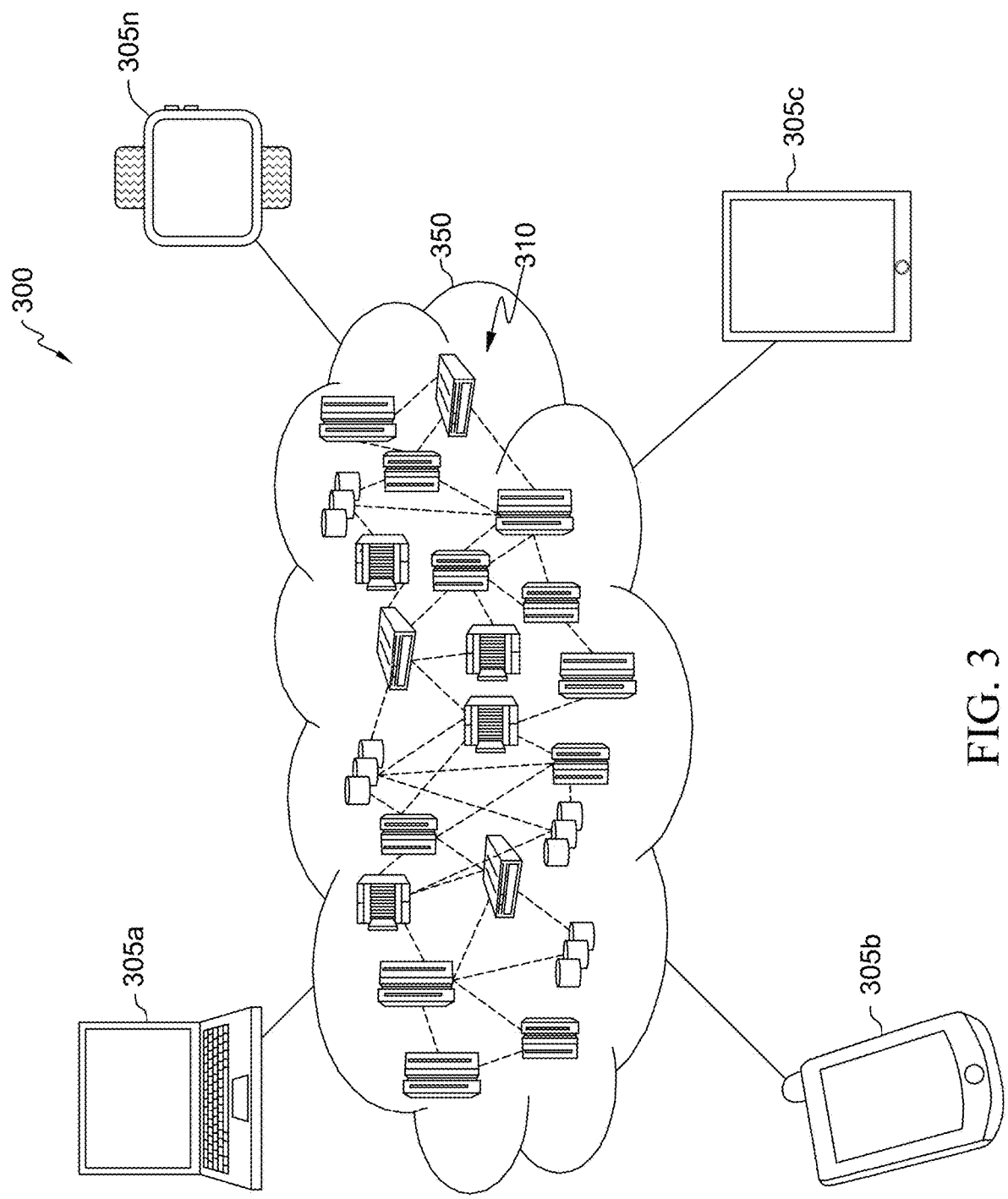
FIG. 3 depicts a block diagram illustrating a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which user device(s) 305a-305n (referred to generally herein as end user device(s) 305), may be used by cloud consumers to access one or more software products, services, applications, and/or workloads provided by cloud service providers or tenants of the cloud network 350. Examples of the user device(s) 305 are depicted and may include devices such as a desktop computer, laptop computer 305a, smartphone 305b or cellular telephone, tablet computers 305c and smart devices such as a smartwatch 305n and smart glasses. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices shown in FIG. 3 are intended to be illustrative only and that computing nodes 310 of cloud computing environment 300 can communicate with any type of computerized device over any type of network and/or network addressable connection (e.g., using a web browser).

Figure 4:
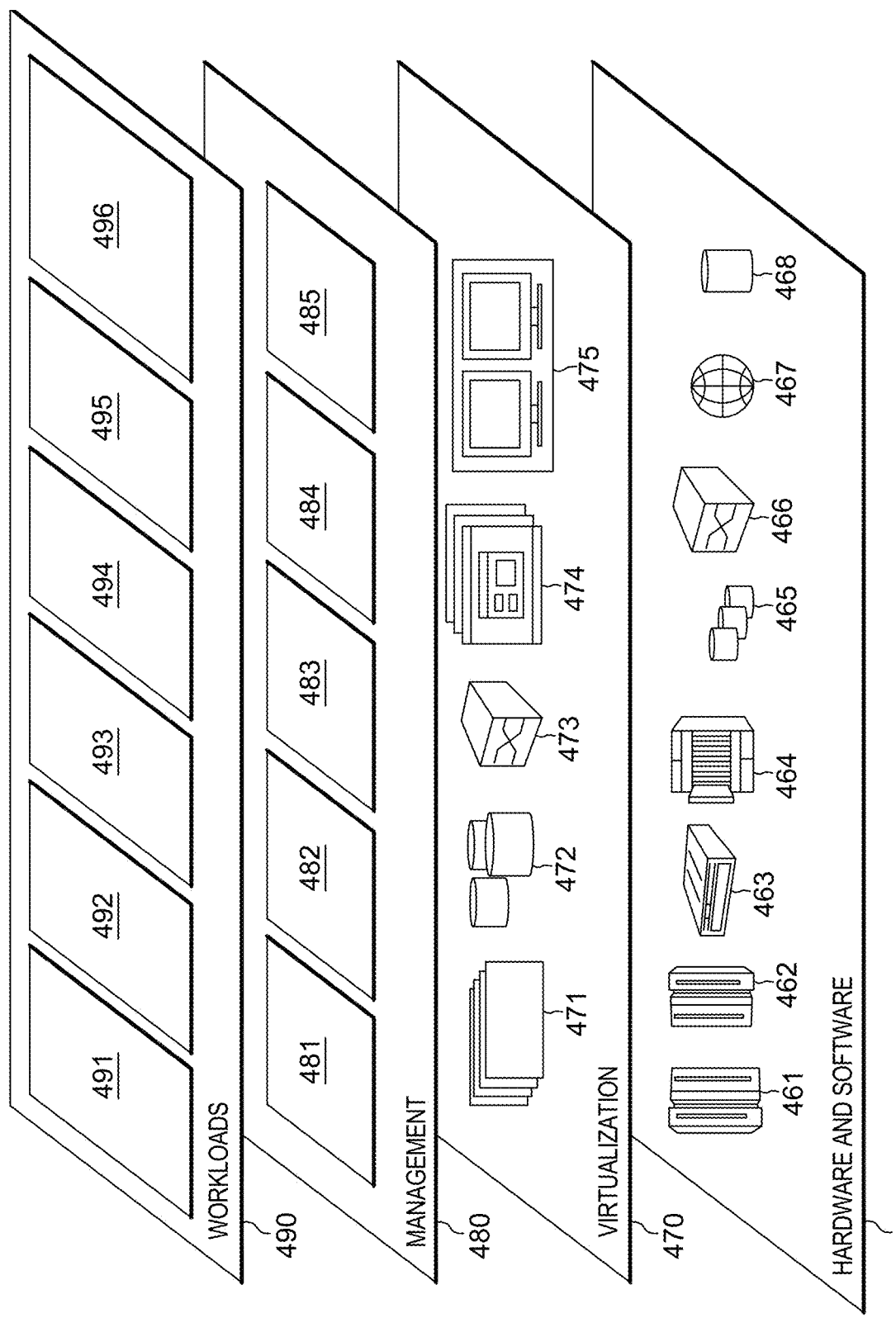
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and lifecycle management 491, data analytics processing 492, multi-cloud management 493, transaction processing 494; database management 495 and videoconferencing 496.
System for Managing and Optimizing Container Image Storage It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 5:
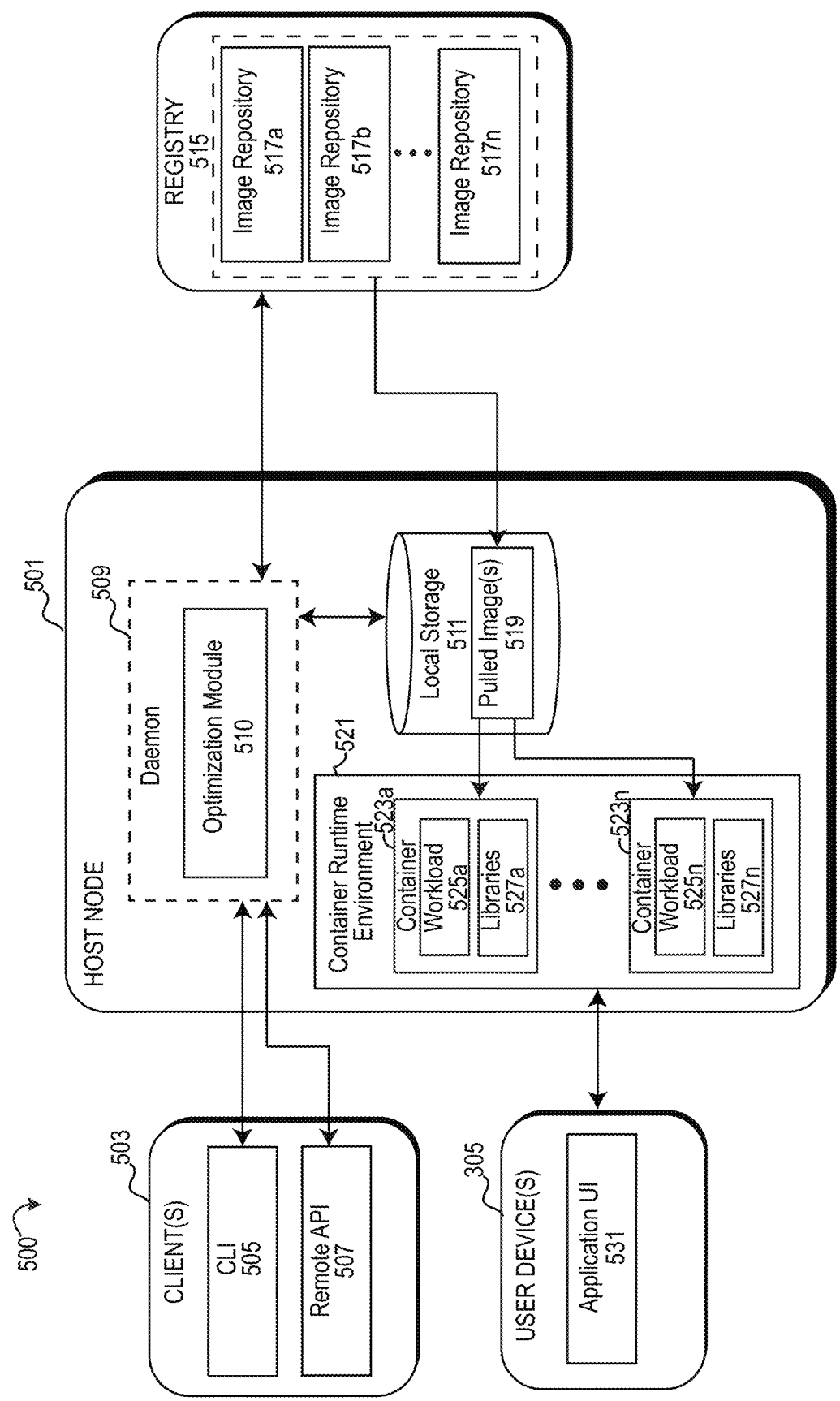
FIG. 5 depicts a functional block diagram describing an embodiment of a computing environment for managing and optimizing container image storage, in accordance with the present disclosure.

Referring to the drawings, FIG. 5 depicts an embodiment of computing environment 500 capable of running a plurality of containerized workloads 525a to 525n (herein generally referred to as workloads 525) as well as manage and optimize container image storage based on the workload trends of each host node 501 of a container system. As depicted in the exemplary embodiment of FIG. 5, the computing environment 500 of the container system may comprise a plurality of components placed in communication with one another. For example, in the exemplary embodiment, computing environment 500 includes components such as one or more client(s) 503, host node 501, registry 515 and/or user device(s) 305. Client(s) 503 may be a primary way for administrators and users running and managing the container system to interact and communicate with each daemon 509. Client(s) 503 may send commands to daemon 509 via a command line interface (CLI) 505 and/or a remote API 507 (such as a REST API) over a network interface and/or over UNIX sockets instructing daemon 509 to execute the commands. Examples of commands that may be submitted by client(s) 503 may include (but are not limited to) the "build", "pull", "push", and "run" commands. Although FIG. 5 depicts client(s) 503 communicating with a single daemon 509, embodiments of client(s) 503 may communicate with more than one daemon 509 process. Moreover, client(s) 503 may reside on the same host as daemon 509 (i.e., host node 501) or may reside on a remote host placed in communication with one or more daemon 509.

Host node 501 may be described as a computing system 100 (physical or virtual) hosting daemon 509. Example of a host node 501 can be any computing system 100 as described above, including laptops, desktops, servers, virtual machines thereof and/or computing resources provided by a cloud network 350. Daemon 509 may listen for incoming commands and API requests from client(s) 503 and manage objects of the container system, including images, containers 523a-523n (herein referred to generally as "containers 523"), networks and storage volumes (such as local storage 511). Daemon 509 may be responsible for building and running containers 523 from images within a container runtime environment 521. An image may refer to a read-only template comprising instructions for creating a container 523. Images may be composed of layers of images that can be cached on the host node 501 and shared across a plurality of containers. Embodiments of containers 523 may be described as a runnable instance of an image. Containers 523 can be created, started, stopped, moved or deleted by the client(s) 503 using the CLI 505 or remote API 507. Containers 523 can be connected to one or more networks, persistent storage 106 (such as local storage 511 and/or other nonvolatile data stores 165, 175, 185). Containers 523 can even be created into a new image based on the current state of a container 523. Containers 523 may be defined by its image as well as any configuration options provided to the container when the container 523 is created or started. When containers 523 are removed, any changes to the state of the container 523 that are not stored in persistent storage 106 may disappear.

Image files used to create containers 523 may be created by users of the container system or others who may share image files publicly or privately. Image files can be published to a registry 515, where the images can be stored in one or more image repositories 517a, 517b . . . 517n (referred to generally herein as "image repository 517") such as an image library. A registry 515 may be part of host node 501 or an external location outside of the host node 501 and may include pointers indicating the storage location of the image files within one of the image repositories 517. Embodiments of a registry 515 can be a public registry or a private registry. Upon execution of a pull command (or in some instance a run command) the daemon 509 can pull a requested image from registry 515 and store the pulled image(s) 519 locally in local storage 511 of the host node 501. In contrast, when a push command is executed by a client(s) 503, the image file can be sent to a registry 515 and stored by one or more image repositories 517.

Embodiments of a daemon 509 may be instructed to run an instance of an image. Upon execution of the run command by a client(s) 503, daemon 509 can pull the image requested to be run from a registry 515 and deploy an instance of the image as a container 523. If the image already resides on local storage 511, the previously pulled image 519 can be executed without needed to re-pull the image from registry 515. Upon running the pulled image 519, daemon 509 may create one or more container 523 within the container runtime environment 521. Container 523 may comprise all applications needed for a workload 525a to 525n (referred to generally herein as "workload 525") and the associated libraries 527a to 527n (referred to generally herein as "libraries 527") needed to run the workload 525 of the container 523. User device(s) 305 may access and use the running workload(s) 525 of the container runtime environment 521 via a user interface (UI) of an application such as application UI 531 as shown in FIG. 5.

Figure 6:
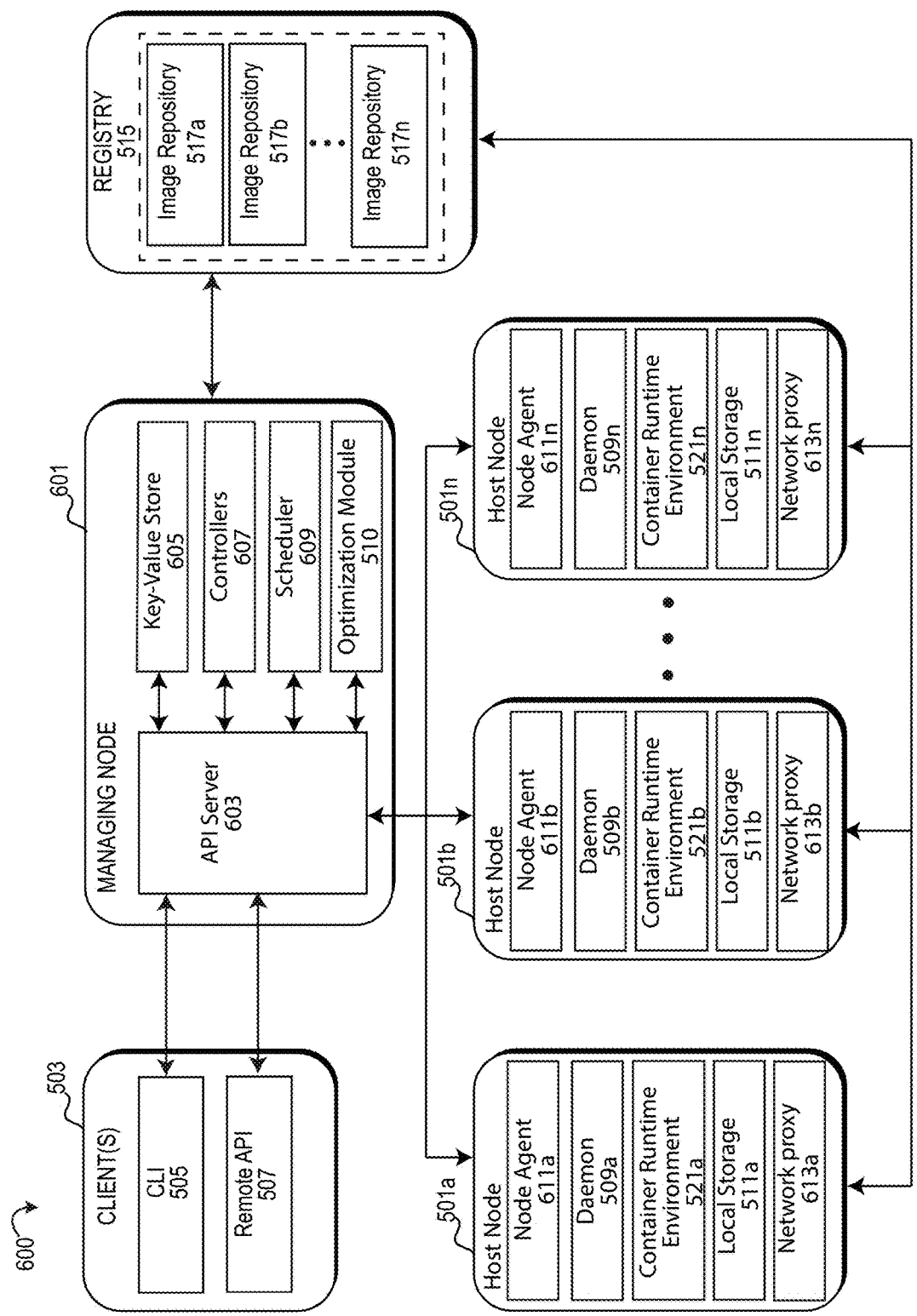
FIG. 6 depicts a functional block diagram describing an alternative embodiment of a computing environment for managing and optimizing container image storage, in accordance with the present disclosure.
Figure 7:
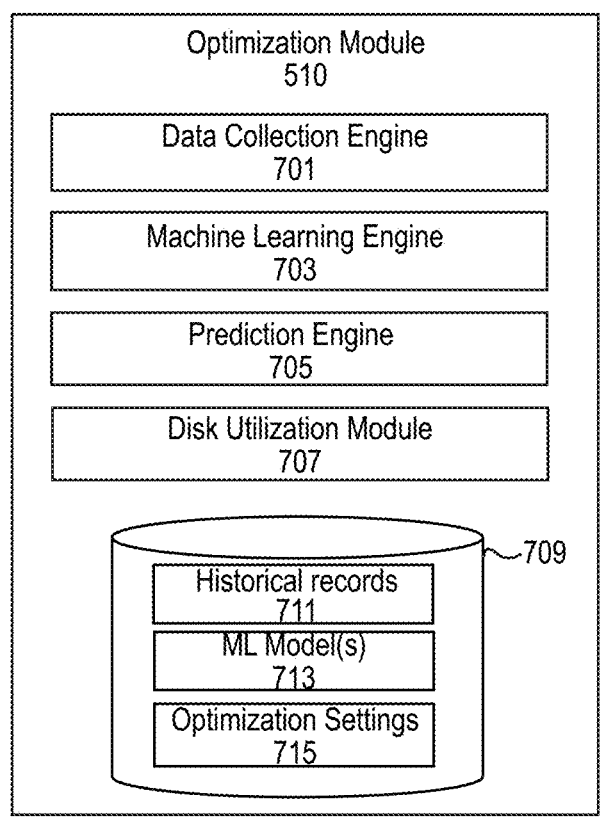
FIG. 7 depicts a function block diagram describing an embodiment of an optimization module for managing and optimizing container image storage, in accordance with the present disclosure.

FIG. 6 illustrates a computing environment 600 depicting an alternative embodiment of a container system. As depicted in FIG. 6, computing environment 600 includes a cluster of nodes represented as a plurality of host nodes 501a, 501b . . . 501n (referred to herein generally as "host nodes 501") being managed by a managing node 601. The host nodes 501 may host containers 523 containing the components of the application workloads 525 and/or pods comprising one or more containers 523. Managing node 601 may function as a control plane, managing the clusters of host nodes 501, containers 523 and/or pods of containers 523 within a cluster. Components of the managing node 601 may make global decisions about a cluster of host nodes 501 (i.e., scheduling) as well as detect and respond to events affecting a cluster, such as starting up new containers 523 and workloads 525. Components of managing node 601 may be run on any machine within a cluster of host nodes 501, however in some embodiments, managing node 601 components may be started on the same machine and may not run containers 523 on the same machine as the components of managing node 601.

As shown in FIG. 6, components of the managing node 601 may include API server 603, key-value store 605, controllers 607, scheduler 609 and/or optimization module 510. API server 603 validates and configures data for API objects which may include containers 523, pods, images, services, etc. The API server 603 services REST operations of remote API 507 calls and may provide the frontend to a cluster's shared state through which all other components (such as the key-value store 605, controllers 607, scheduler 609 and/or optimization module 510) may interact. Embodiments of key-value store 605 may be used as a backing store for all cluster data. A scheduler 609 may be a component of the managing node 601 that may be responsible for watching for newly created containers 523 and/or pods of containers 523 that have not been assigned to a host node 501. The scheduler 609 may select and assign host nodes 501 for the containers 523 to run on. A controller manager may run one or more controllers 607 and associated controller processes. Logically, each controller may be a separate process, but to reduce complexity, controller processes may be compiled into a single binary and run as a single process. Examples of controllers 607 may include a node controller, job controller, endpoints controller, and/or service account and token controllers. A node controller may be responsible for noticing and responding when one or more host nodes 501 go down or stop responding. A job controller may watch for job objects that represent one-off tasks, then create containers 523 or pods of containers 523 to run those tasks to completion. Endpoints controllers may populate endpoint objects (i.e., join services with containers 523 or pods of containers 523). Service account and token controllers may create default accounts and API access tokens for new namespaces.

In some embodiments of the computing environment 600, controllers 607 may include a cloud controller manager, which may embed cloud-specific logic into the container system. For example, by linking a cluster of host nodes 501 into a cloud provider's API and separate out components that interact with the cloud platform from components that may only interact with a cluster of host nodes 501. Embodiments of the cloud controller manager may include a node controller for checking the cloud provider to determine if a node has been deleted in the cloud; a route controller for setting up routes in an underlying cloud infrastructure; and/or a service controller for creating, updating and/or deleting cloud provider load balancers.

As shown in FIG. 6, host nodes 501 depicted in computing environment 600 may include one or more additional components. For example, host nodes 501 may include a node agent 611a-611n (hereinafter referred to generally as "node agent 611") and a network proxy 613a-613n (hereinafter referred to generally as "network proxy 613"). Node agent 611 running on one or more host nodes 501 in a cluster may track health and status of the containers 523 and/or pods of containers 523 running on a host node 501. Node agent 611 may take a set of specifications and ensure that containers 523 described by the specifications are running and healthy. Embodiments of network proxy 613 may run on each host node 501 in a cluster and maintain network rules on the nodes, allowing for communication between the containers 523 or pods thereof from network sessions, inside and/or outside the cluster as well as with the managing node 601.

Embodiments of systems configured to create and run containers 523, such as the container systems depicted in computing environments 500, 600 may include an optimization module 510. Embodiments of the optimization module 510 may be integrated into a daemon 509 as part of the daemon process or as a plugin in some embodiments. In other embodiments, the optimization module 510 may be a separately running process within the memory 105 of a host node 501 and/or in remote communication with a host node 501. For example, as shown in FIG. 6, the optimization module 510 may be a component of the managing node 601. Embodiments of the optimization module 510 may be responsible for managing and optimizing retrieval of image files and storage thereof by host nodes 501 and/or managing nodes 601 thereof. Image management and retrieval may be optimized by intelligently analyzing workload trends of the container system, downloading requested images and data automatically predicted to be used at a future point in time and cleaning up images from local storage 511 predicted to not be used for an extended period of time or may not be used again at all. The term "module" may refer to may refer to a hardware module, software module, or a module may be a combination of hardware and/or software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more computing systems 100 operating as part of the computing environments 500, 600. For instance, in the exemplary embodiment depicted in FIG. 5, a daemon 509 hosted by host node 501 may include optimization module 510 while in the computing environment 600 of FIG. 6, the managing node 601 may host the optimization module 510. Embodiments of optimization module 510 may include a plurality of components or modules, including (but not limited to) a data collection engine 710, machine learning engine 703, prediction engine 705, disk utilization module 707 and/or storage 709.

Embodiments of the data collection engine 701 of the optimization module 510 may be responsible for performing tasks associated with collecting and maintaining historical image records comprising image and data usage information about image files being executed by host node(s) 501 as part of one or more workloads 525, as well as detailed information about workloads 525 utilizing the image file. For example, for each record collected by the data collection engine 701, the historical record 711 may include an image entry describing an image name, image size, image version, a history of the image being executed as a container 523, one or more timestamps describing events associated with the image and/or container 523 running the image as a workload 525, download time(s) for pulling the image from a registry 515, and/or a workload entry describing one or more workloads that may require the image of the record to deploy the workload 525. For each workload entry of an image, the workload entry may further describe a workload name, workload type, historical timestamps for starting or stopping the workload 525, historical running time of the workload 525, the types of host node(s) 501 requested to run the workload 525 and/or the number of host node(s) 501 requested to run the workload 525.

Historical records 711 of the images and workloads 525 collected by the data collection engine 701 of the optimization module 510 can be accessed and shared with machine learning engine 703. Embodiments of the machine learning engine 703 may learn and draw conclusions about one or more workload trends, including image and data requirements for workloads 525 based on the historical records 711. In some embodiments of the machine learning engine 703, image and data requirement trends can be ascertained by machine learning engine by inputting one or more attributes, properties or features of the historical record 711 into machine learning models 713. In the exemplary embodiment, the machine learning models 713 (referred to herein as ML model(s) 713) may be based on the Naïve Bayes algorithm. Naïve Bayes is a classification technique based on Bayes' Theorem; a mathematical formula used for calculating conditional probabilities of an event occurring given that another event has (by assumption, presumption, assertion, or evidence) occurred. Bayes theorem may be written as follows:

$$P(A|B) = \frac{P(B|A) * P(A)}{P(B)}$$

wherein: P(A|B) is the probability of an event A occurring given evidence event B has already occurred (referred to as the posterior probability);
P(B|A) is the probability of event B occurring given evidence event A has already occurred;
P(A) is the probability that event A happens on its own; and
P(B) is the probability that event B happens on its own.

A fundamental assumption of the Bayes theorem is that each feature operates on an assumption of independence among predictors and each feature has an equal contribution to the outcome. In other words, the Naïve Bayes theorem is a classifier that assumes that the presence of a particular feature in a class is un-related to the presence of any other feature. In order to predict workload trends based on the features and attributes of the historical records 711 of images and workloads 525, the Bayes Theorem can be rewritten to predict class variables (y) given conditions as presented by the historical records 711; namely one or more parameters, attributes and features (X) of the historical records' 711 dataset. The rewritten B ayes Theorem may be written as follows:

$$P(y|X) = \frac{P(X|y) * P(y)}{P(X)}$$

Since X represents the individual parameters, attributes and features (x) of the historical record 711 inputted into machine learning model of the Naïve Bayes algorithm, $X=(x_1, x_2, x_3 \ldots x_n)$. By substituting for X and expanding the Bayes Theorem using the chain rule, the equation may be expanded as follows:

$$P(y|x_1, \ldots x_n) = \frac{P(x_1|y)P(x_2|y) \ldots P(x_n|y)P(y)}{P(x_1)P(x_2) \ldots P(x_n)}$$

Values for each value of x can be obtained from the dataset derived from attributes, parameters and features of the historical record 711 and substituting them into the equation. For all entries in the dataset, the denominator may not change and thus may remain static. When the denominator is static, it may be removed, and proportionality can be injected, thus resulting in the following equation:

$$P(y|x_1, \ldots, x_n) \propto P(y)\Pi_{i=1}^{n} P(x_i|y)$$

Under conditions where a classification using the Naïve Bayes algorithm is multivariate, the class variable (y) may be found with maximum probability using the following equation:

$$y = \operatorname{argmax}_y P(y) \Pi_{i=1}^{n} P(x_i|y)$$

Figure 9:
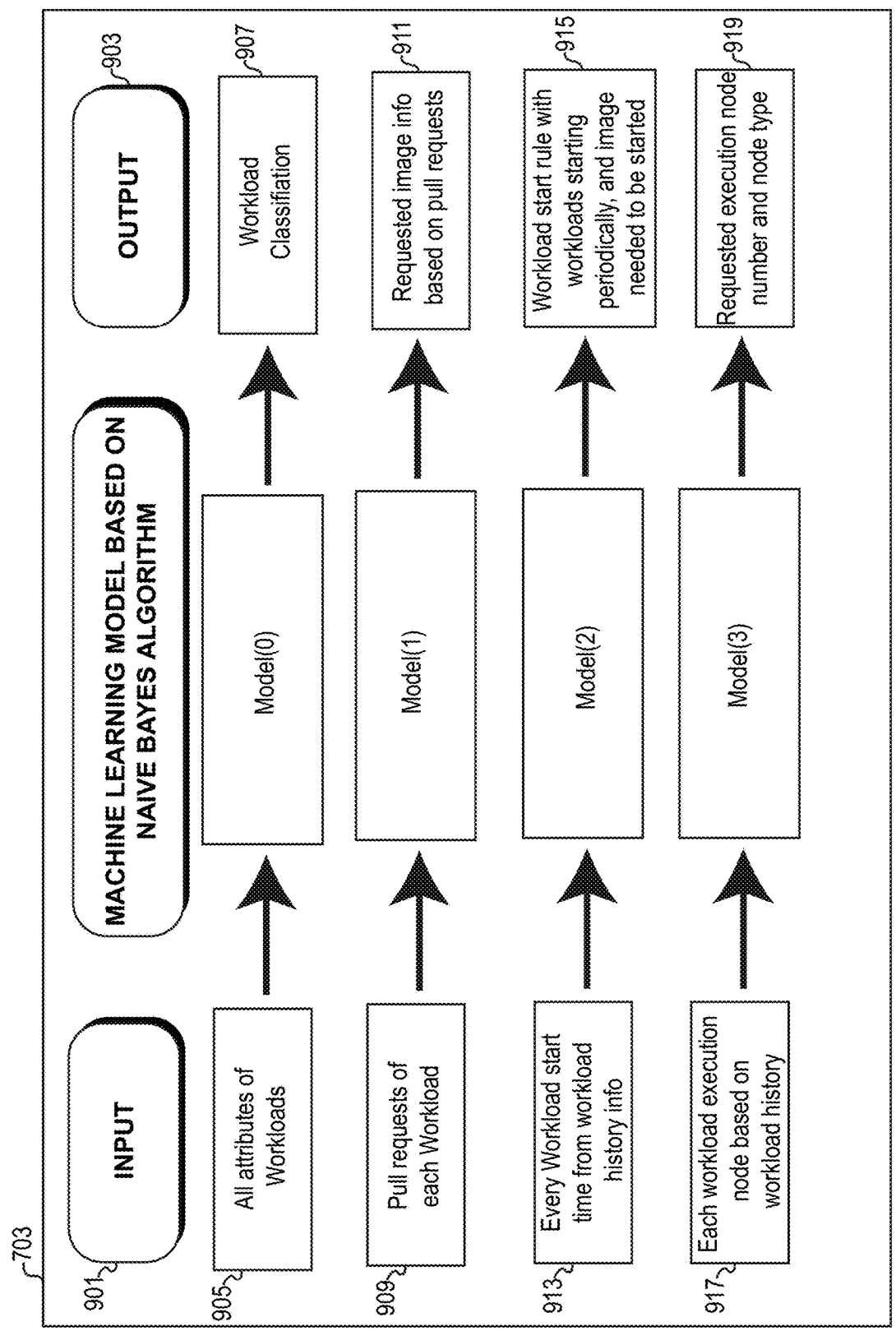
FIG. 9 depicts a functional block diagram describing an embodiment of a machine learning engine of an optimization module, in accordance with the present disclosure.

Posterior probability P(y|X) of image and data requirement trends can be calculated using various inputs into one or more ML models 713 of the machine learning engine 703 that are based on the Naïve Bayes algorithm by creating a frequency table for each parameter, attribute, or feature against a provided target. The frequency tables can be molded into likelihood tables for each attribute, feature or parameter, followed by using the Naïve Bayes equation to calculate posterior probability for each class. The class with the highest posterior probability is outputted by the Naïve Bayes algorithm as the prediction. FIG. 9 provides an example of the machine learning engine 703 using various subsets of data collected as part of the historical record 711 to output conclusions describing data and requirements trends of a container system.

As shown in FIG. 9, a series of different inputs 901 can be applied to various ML models 713 in order to receive a target output 903 describing one or more trends of the historical record 711. For example, all of the workload attributes 905, such as the workload name, type, start time, running time, kind of node, etc., can be inputted into a first ML model 713 (depicted as Model(0)), resulting in an output describing a most probable workload classification 907 of a future workload based on the attributes of the workloads previously executed by the container system. A second model (depicted as Model(1)) in the exemplary embodiment of FIG. 9, may receive as input 909, each of the pull requests of each workload 525, as described by the historical record 711, and predictively output based on the trends of the historical record 711, an output 911 comprising the most probable requested image information based on the history of the pull requests inputted into Model(1). A third model (depicted as Model(2)) may provide an output 915 describing a workload start rule using the time differences between start times of the workloads recorded by the historical record 711, for example by using timestamps describing each workload start time as the input 913. Moreover, a fourth model in the exemplary embodiment (depicted as model(3)) may output 919 image or data requirements trend describing a host node 501 type and a number of host nodes 501 to perform an execution of workloads 525 using attributes of each host node 501 executing a workload as recorded by the historical record 711 as input 917 into Model(3).

Prediction engine 705 of the optimization module 510 may perform tasks, processes and/or functions of the optimization module 510 responsible for predicting which images will be requested by future workloads 525. Predictions of future workloads can be learned based on the trends of image and data requirements outputted by the machine learning engine 703. For example, images for future workloads may be predicted based on the combination of one or more trends described by the outputs 907, 911, 915 and/or 919 of the machine learning engine 703, including but not limited to: workload classification, requested image information based on pull requests, workload start rule as well as a node number and node type for executing the predicted future workload. In some embodiments, the prediction engine 705 may be a separate component placed in communication with the machine learning engine 703 and may utilize the outputs of the ML models 713 to make predictions. In other embodiments, the machine learning engine 703 and prediction engine 705 may be a single component that combines the machine learning engine 703 with the prediction engine 705 to identify workload trends and make future workload predictions based on the identified workload trends.

Embodiments of optimization module 510 may send instructions or commands to the daemon 509 using one or more predictions of prediction engine 705. For example, optimization module 510 may use future workload predictions based on the workload trends of the container system's historical records 711 to check whether or not a required image(s) for the future workload exists on the target kind of host node 501 and when a required image for a future workload is not stored by local storage, the daemon 509 may initiate a pulling task to acquire the image file. Optimization module 510 may periodically instruct the daemon 509 to check whether one or more host nodes 501 need to download images files and/or data to run the future workload. The timing interval for sending a periodic check for locally stored images by the host node 501 may be defined by a user or administrator of the container system and/or automatically by the optimization module 510. Intervals set for periodically checking whether images exist in the local storage 511 of host nodes 501 may be stored as part of the optimization settings 715 of the optimization module 510. In some embodiments, a request to check the status whether local storage 511 contains a pulled image(s) for an upcoming future workload may be initiated by a client 503 of the container system.

During a checking cycle for an image, the optimization module 510 and/or daemon 509 may go through prediction results of the prediction engine 705 to determine whether or not a pulling task should be initiated to retrieve the image file(s) needed to deploy the future workload. In the exemplary embodiment, the daemon 509 may initiate a task to pull an image file from a registry 515 to local storage 511 of a host node 501 (where the host node 501 lacks the pulled image 519) when the current local time+the maximum recorded download time of the image file+a pre-defined download buffer time is less than or equal to a predicted start time for the future workload. A threshold for the pre-defined buffer time may be defined by a user or administrator of the container system and may be stored as part of the optimization settings 715 of the optimization module. The pre-defined buffer time may provide additional time for pulling the image file from registry 515 and may account for failures that may result during the pulling process; for example, due to network issues such as slow download speeds and/or an inability to connect to the registry 515 as well as I/O issues that may arise during the pulling task.

Embodiments of optimization module 510 may use one or more outputs of the machine learning engine 703, historical records 711 information and/or predictions about the future workloads provided by prediction engine 705 during a triggered pulling task to prioritize and select one or more host nodes 501 that meet one or more requirements to run an upcoming future workload. For example, during a pulling task, optimization module 510 may consider properties of the future workload to select host nodes 501, such as the image required, the kind of host node 501 required, the number of host nodes 501 required, a time or deadline for the host node 501 to be ready to execute the upcoming future workload and/or network I/O requirements. Optimization module 510 may select (or instruct the daemon 509 to select) any host nodes 501 of the container system that satisfies the properties of the workload requirements of the future workload. The host nodes 501 that satisfy the workload requirements for the predicted future workload may be ordered sequentially based on the availability of one or more computing resources. For example, host nodes 501 may be ordered in a list of nodes by the amount of available CPU or processing power, memory, free disk space on local storage 511, and/or a combination of resources thereof. Embodiments of the optimization module 510 and/or daemon 509 may iteratively move through the ordered list nodes starting at the first host node 501 and check whether or not the host node 501 meeting the future workload's requirements has the image placed in local storage 511 already, and if the image has already been pulled and stored by the host node 501, the host node 501 is selected as one of the nodes to run the future workload. Likewise, where the image for the future workload has not been pulled to the host node 501 iteratively examined by the optimization module 510, optimization module 510 may compute whether the available amount of free space on the host node 501 being examined is greater than the amount of space required to store the pulled image 519 for the future workload. When not enough free space is available on the host node 501 being examined, the disk utilization module 707 may be requested to trigger a utilization process that may create additional free space on the host node 501 for storing the pulled image 519 used for deploying the future workload.

Disk utilization module 707 may perform tasks, functions or processes of the optimization module 510 associated with managing and removing image files saved to local storage 511 in order to create additional space that will store pulled image(s) 519 needed for deploying an upcoming future workload as a container 523 via one or more new pulling tasks. Disk utilization management by the disk utilization module 707 may be triggered periodically, at scheduled intervals, and/or on demand by a pulling task of the optimization module 510. The disk utilization module 707 may be assigned a target value describing a target amount of free space within local storage 511 that may need to be available as a result of the disk utilization process. The target value for the free space may be set as an amount of free space equal to or exceeding the size of an image that is being pulled to local storage 511 for the future workload.

Embodiments of the disk utilization module 707 may create additional free space on local storage 511 by removing pulled images 519 that are least likely to be used within the near future, while maintaining pulled images on local storage that may be more likely for future workloads sooner. Disk utilization module 707 may select pulled images 519 for removal from local storage 511 by identifying which workloads 525 are predicted to be used sooner than others based on predictions of the prediction engine 705 and/or the outputs of the machine learning engine 703. By knowing when upcoming workloads 525 are expected to be deployed, the disk utilization module 707 can determine the pulled images 519 that are associated with the workloads 525. For example, in some embodiments, the optimization module 510 and/or daemon 509 may maintain a workload/image relationship database detailing an association between workloads 525 and the images used to deploy the workloads 525 as containers 523. Pulled images 519 stored by the local storage 511 can be ordered by predicted upcoming times of deployment, wherein the most immediate pulled images 519 predicted to be deployed may be at the top of the ordered list and the pulled images 519 being deployed furthest in time from the current moment in time (if at all) are placed at the end of the ordered list. Once the list is ordered by the predicted time of workload 525 deployment, disk utilization module 707 may delete the pulled image 519 from local storage 511 residing at the end of the ordered list (i.e., the pulled image being deployed at a point in time furthest from the current point in time). Disk utilization module 707 may compare the amount of free space on local storage 511 against the target value of free space. When the amount of free space is still less than the target value following deletion of a pulled image 519, disk utilization module 707 may continue to iteratively delete the last pulled image in the ordered list and check the resulting free space against the target value for free space. Upon meeting and/or exceeding the target value, the disk utilization process of the disk utilization module 707 may end, and the daemon 509 can pull the image file for the upcoming future workload from registry 515 to local storage 511.

Disk Utilization Example

The following example provides an example of production case utilizing systems and methods for managing image file storage of a container system. As shown in the example below in Table 1, a store or business may utilize eight different workloads as follows:

TABLE 1

| Name | Type | Image Size | Start Time | Description |
|---|---|---|---|---|
| Workload A | Regular | 10GB | Monday Morning | Counting storehouse and generating a restock list |

TABLE 1-continued

| Name | Type | Image Size | Start Time | Description |
|---|---|---|---|---|
| Workload B | Regular | 8GB | Daily 12:00pm | every Monday Checking price adjustments or sale promotions daily at 12pm |
| Workloads C, D, E | On-Demand | 2GB | On-Demand | |
| Workloads F, G, H | On-Demand | 5GB | On-Demand | |

As shown in this example, workload A is known to regularly run every Monday morning, while workload B is known to run every day at 12 pm. Since regular workload A is only needed to count the storehouse and generate restock list on each Monday, the image file can be reliably pulled and prepared weekly on Monday before workload A is deployed, regularly saving 10 GB of space on local storage since the image needed for workload A is predictably only used once per week. Likewise, workload B runs once per day at 12 pm and can therefore be re-pulled once per day to reliably deploy workload B by noon. Optimization module 510 described herein, approximately 40 GB of space may be needed on each host node 501 to store all images required to deploy workloads A-H, whereas using the optimization module 510 to manage container systems as described herein, disk space on the cloud can be reduced by nearly 50% since only 18-20 GB of data may be enough space.

Method for Managing and Optimizing Container Image Storage

Figure 8A:
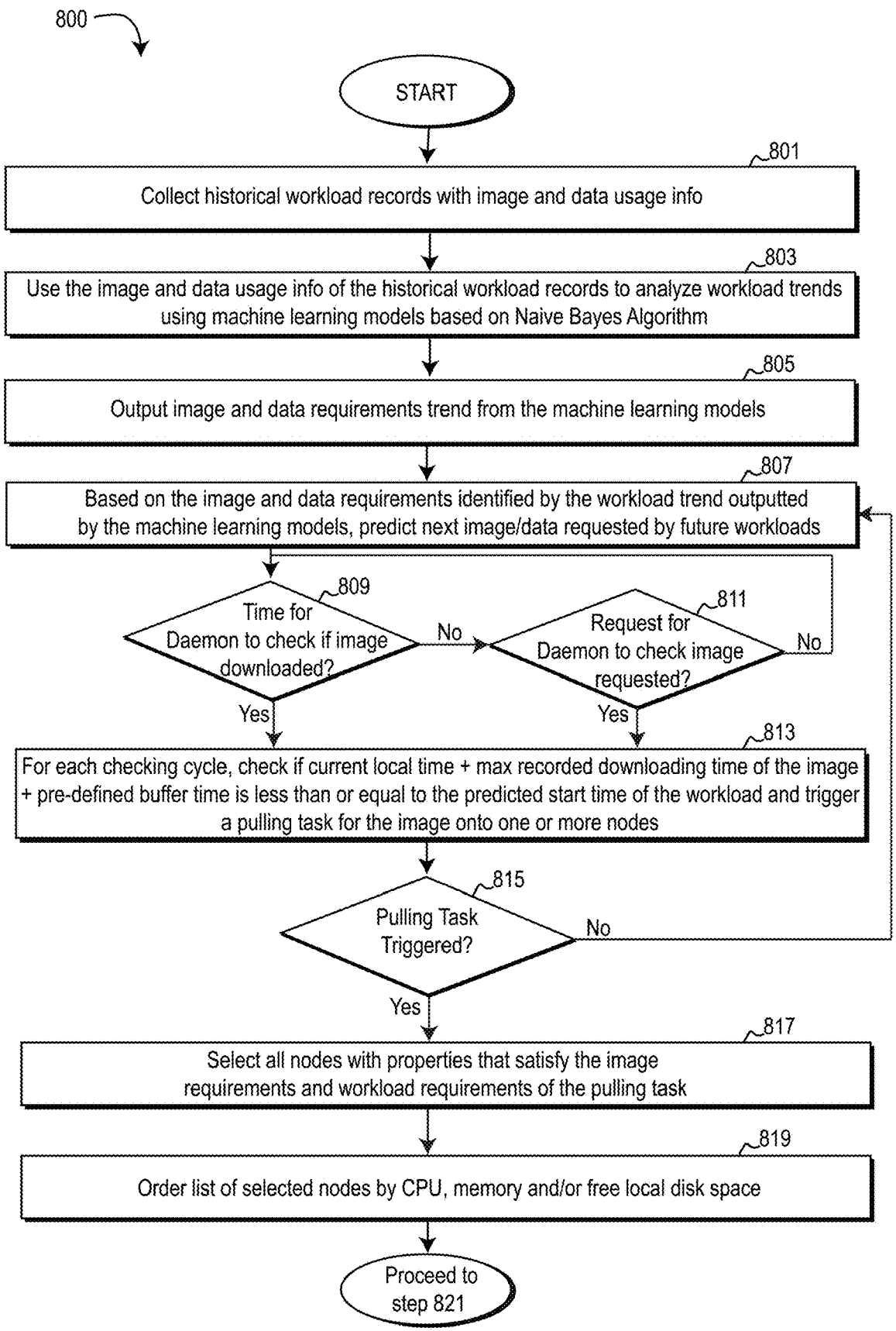
FIG. 8A depicts a flow diagram describing an embodiment of a method for managing and optimizing container image storage in accordance with the present disclosure.
Figure 8B:
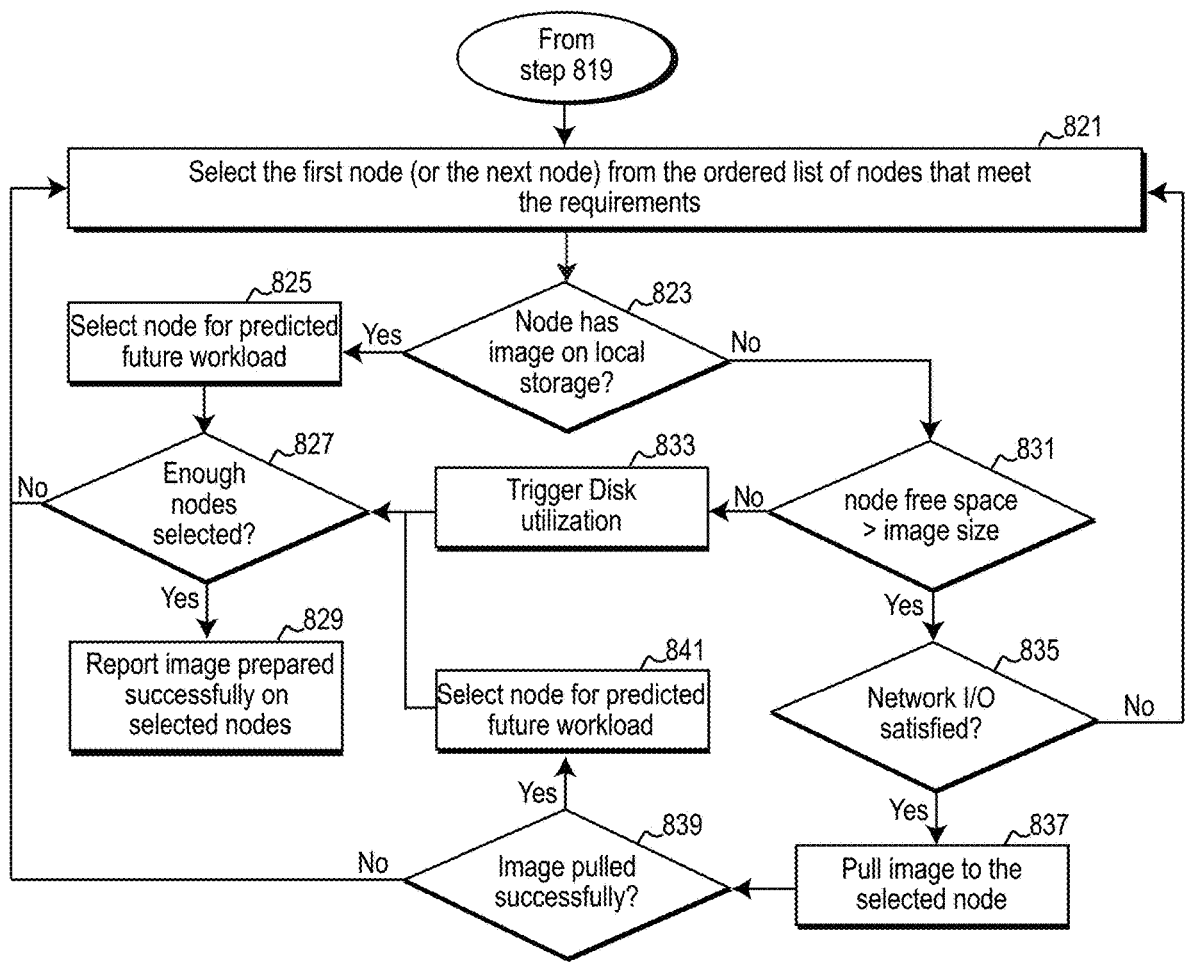
FIG. 8B is a continuation of the flow diagram of FIG. 8A, describing the embodiment of the method for managing and optimizing container image storage.
Figure 8C:
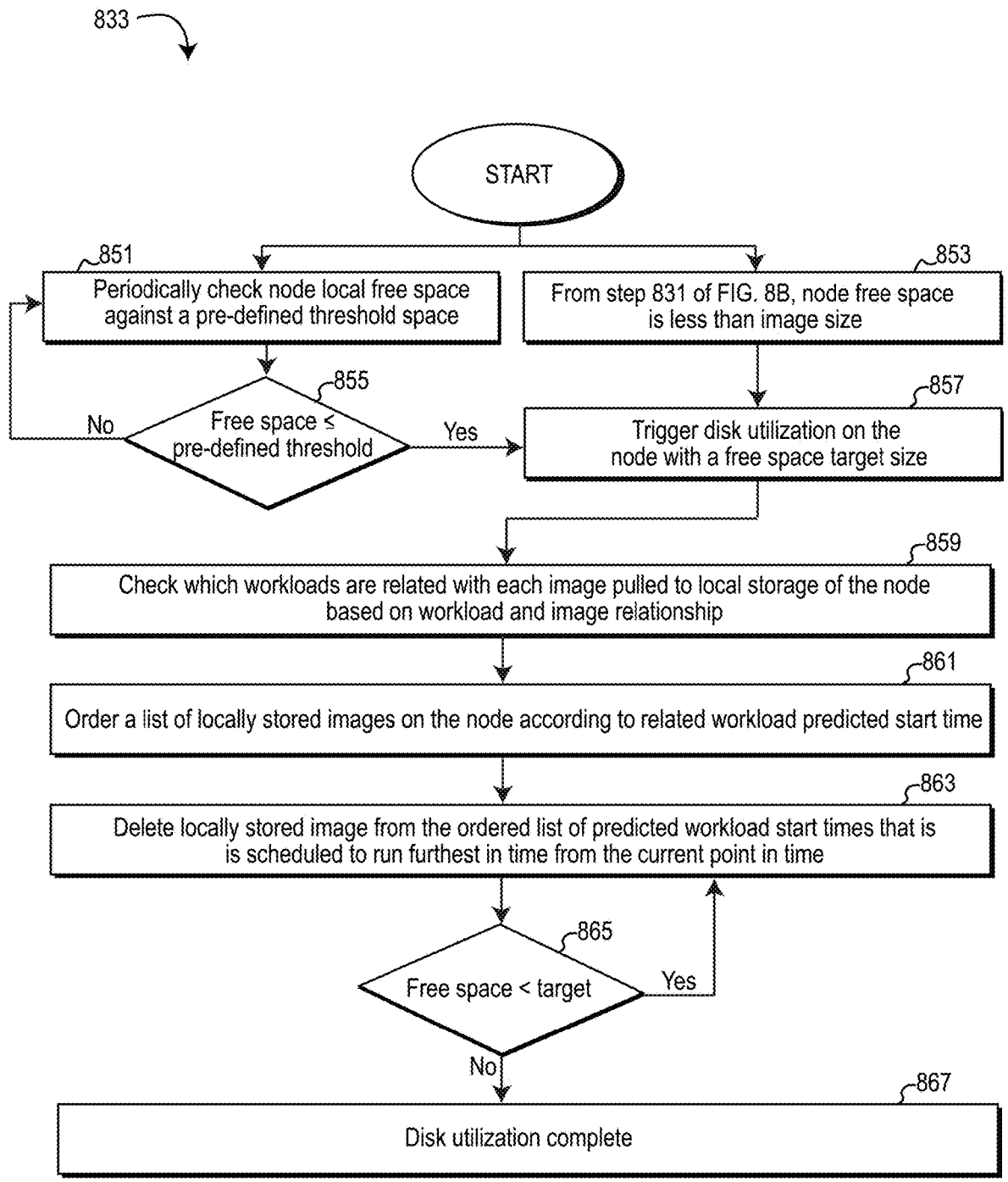
FIG. 8C depicts a flow diagram describing an embodiment of a disk utilization process step of the method for managing and optimizing the container image storage described by the methods of FIGS. 8A-8B.

The drawings of FIGS. 8A-8C represent embodiments of methods for managing and optimizing container image storage, as described in accordance with FIGS. 3-7 and FIG. 9 above, using one or more computing systems defined generically by computing system 100 of FIGS. 1-2; and more specifically by the embodiments of container systems depicted in FIGS. 3-7, FIG. 9 and as described herein. A person skilled in the art should recognize that the steps of the method described in FIGS. 8A-8C may be performed in a different order than presented and may not require all the steps described herein to be performed.

The embodiment of method 800 described by FIGS. 8A-6C for managing and optimizing container image storage may begin at step 801. During step 801, data collection engine 701 of the optimization module 510 collects historical records 711 describing past workloads 525 deployed as one or more containers 523 of the host nodes 501 of container system, as well as comprising image and data usage info for deploying the workloads 525. In step 803, the historical records 711 collected by the data collection engine 701 comprising image and data usage information may be analyzed by a machine learning engine 703 applying one or more ML models 713. Attributes, parameters and features of the historical records may be inputted into ML models 713 that may be based on the Naïve Bayes algorithm to output one or more workload trends of the container system. In step 805, workload trends describing image and data requirements for the workloads 525 of the container system are outputted by the ML models 713.

In step 807 of method 800, prediction engine 705 may make one or more predictions about one or more upcoming future workloads predicted to be deployed based on the workload trends describing the image and data requirements identified by the ML models 713. Based on the prediction of the future workload, an associated image file may be identified that may be required for deploying the future workload. In step 809, a determination may be made whether or not it is time for daemon 509 to perform a periodic check whether the image file for the future workload is currently downloaded to one or more host nodes 501 capable of deploying the future workload. If it is not time for a periodic check, the method may proceed to step 811 and further determine whether or not a request for the daemon 509 to check whether the image for the future workloads has been downloaded to one or more host nodes 501. If no request has been made to check the download status of the image file, the method may return to step 809. Moreover, if during either step 809 or step 811 the time to periodically check for whether the image has been downloaded by one or more host nodes 501 or a request has been made to check whether the image has been downloaded, the method may proceed to step 813.

In step 813, for each checking cycle (either triggered based on time or request), optimization module 510 may check whether the current local time+maximum recorded download time of the image file+a predefined buffer is less than or equal to a predicted starting time of the future workload and trigger a pulling task for the image onto one or more nodes 501. In step 815, a determination is made whether or not a pulling task has been triggered. For instance, where current local time+maximum recorded download time of the image file+a predefined buffer is less than or equal to a predicted starting time of the future workload, method 800 may proceed to step 817. Otherwise, a pulling task is not triggered and method 800 may return to step 807 and predict the next upcoming future workload based on the workload trends of the container system.

In response to the pulling task being triggered, in step 817, the optimization module 510 may select any and/or all host nodes 501 comprising properties that satisfy the image and workload properties for the upcoming future workload predicted to be deployed. Properties that satisfy the image and workload requirements may include the image required, the kind of node required, the number of nodes required, a deadline for the nodes to deploy the future workload, and required network I/O. From the selected host nodes 501 that meet the image and workload properties, in step 819, an ordered list of host nodes 501 may be ordered by computing resources, including CPU or processing power, memory free local disk space, and/or a combination of resources thereof. In step 821, the first host node at the top of the ordered list prepared in step 819, may be selected.

In step 823, the selected host node 501 may be examined for whether or not the host node 501 has the required image stored within local storage 511 to deploy the future workload. If the selected host node 501 does have the image file within local storage 511, the method 800 may proceed to step 825, wherein the host node is selected to deploy the future workload at the appropriate start time. In step 827, a determination is made whether enough host nodes 501 have been selected to deploy the future workload, in accordance with the properties and requirements of the future workload. If enough nodes have been selected, the method may proceed to step 829 whereby a report is provided indicating successful preparation of host nodes 501 to deploy the future workload on the selected nodes. Likewise, if during step 827 it is determined that enough nodes have not been selected as prescribed by the properties and requirements for the future workload, method 800 may return to step 821 and select the next host node 501 from the ordered list of nodes meeting the properties and requirements for deploying the future workload.

Referring back to the determination made in step 823, if a host node selected during step 821 is determined to no have the requisite image file already placed in local storage 511, method 800 may proceed to step 831. In step 831, the optimization module 510 may determine whether the amount of free space on the host node 501 is greater than the image size for the image file required to deploy the future workload. If it is determined that the free space on the node is greater than the image size, method 800 may proceed to step 835. During step 835, a determination may be made whether or not requisite network I/O of the selected host node 501 is satisfied. For example, determining whether or not host node 501 is able to successfully pull the image file from a registry 515 before a deadline for deploying the future workload. If network I/O is determined not be satisfied, method 800 may proceed back to step 821, wherein the next host node 501 of the ordered list is selected. On the contrary, if during step 835, network I/O is satisfied, the method 800 proceeds to step 837. During step 837, daemon 509 pulls the image from registry 515 to the local storage 511 of the selected host node 501. In step 839, a check is performed to determine whether or not pulling the image file from registry 515 was successful. If the pull task was not successful, the method proceeds back to step 821 wherein the next host node 501 on the ordered list is selected. Otherwise, if the image was pulled successfully, the host node is scheduled to deploy the future workload and the method proceeds back to step 827.

Referring back to the determination made during step 831, regarding whether or not the free space of the host node 501 is greater than the image size of the image file required to deploy the future workload, if the node free space is not greater, method 800 may proceed to step 833, triggering a disk utilization process as described in further detail by FIG. 8C. As shown in FIG. 8C, the disk utilization process may be triggered in a plurality of different ways. For example, As shown by step 853, the disk utilization process may be triggered from step 831 of FIG. 8B, whereby the host node's free space during the pulling task is determined to be less than the image size of the image file for deploying the future workload. From step 853, the disk utilization method can proceed to step 857, triggering disk utilization on the host node 501 to free up enough space to pull the image file into local storage 511.

In other instances, disk utilization may be triggered periodically as shown in step 851 whereby host nodes are periodically checked whether local free space is above a pre-defined threshold. The periodic check may be made at regular pre-defined intervals or upon request by a user or administrator of the container system. The pre-defined threshold level of space may be a value set by a user or administrator or automatically set as the free space required to pull the next upcoming future workload. In step 855, a determination is made whether free space is less than or equal to the threshold. Upon determining that free space is less than the predefined threshold, the disk utilization method may proceed to step 857 wherein the disk utilization is triggered to free up local storage to a particular target size of free space.

Once disk utilization is triggered with a target size of free space for the host node 501, in step 857, the disk utilization proceeds to step 859. During step 859, disk utilization module 707 may check relationships between pulled images 519 stored by local storage 511 and the workloads 525 associated with the pulled images 519. During step 861, disk utilization module 707 orders the list of locally stored pulled images 519 of the host node 501 according to the predicted start time of the related workloads identified during step 859. Pulled images 519 stored to the local storage 511 predicted to have a start time furthest into the future (if at all) can be ordered at the end of the ordered list. In step 863, disk utilization module 707 may delete the locally stored image from the ordered list of pulled images 519 predicted to have a workload start time scheduled to run furthest in time from a current point in time. Upon deleting the pulled image 519 from the local storage in step 863, a check may be performed in step 865 comparing whether or not free space of the local storage is less than the target amount of free space. If the amount of free space remains less than the target amount of free, the disk utilization module 707 may return to step 863 and delete from the remaining pulled images 519 in the ordered list predicted to have a workload start time that is scheduled to run furthest in time from the current point in time. Otherwise, if the amount of free space is greater than or equal to the target amount of free space in step 865, the method may proceed to step 867, whereby the disk utilization process is completed.

What is claimed is:

1. A computer-implemented method for managing and optimizing container image storage, the computer-implemented method comprising:
   inputting, by a processor, image and data information of a historical workload record into a machine learning model configured to predict future workload requirements based on workload trends of the historical workload record;
   learning, by the processor, image and data requirement trends of the historical workload record using the machine learning model;
   outputting, by the processor, predicted image and data requirements for future workloads based on the image and data requirement trends learned from the machine learning model;
   engaging, by the processor, a checking cycle wherein a daemon process checks whether an image file for an upcoming future workload as predicted by the predicted image and data requirements needs to be downloaded to one or more nodes prior to running the upcoming future workload; and
   triggering, by the processor, a pulling task upon a current local time plus a max recorded download time of the image file plus a pre-defined buffer time is less than or equal to a predicted start time of the upcoming future workload.

2. The computer-implemented method of claim 1, wherein the pulling task comprises:
   selecting, by the processor, a plurality of nodes with properties satisfying image requirements and workload requirements of the upcoming future workload;
   ordering, by the processor, the plurality of nodes with the properties satisfying the image requirements and workload requirements by highest availability of one or more computing resources; and
   iteratively checking, by the processor, the plurality of nodes sequentially, starting with a first node in the ordering of the plurality of nodes, for whether a selected node has the image file for the upcoming future workload stored by a local storage device of the selected node, wherein upon confirming the image file for the upcoming future workload is locally stored by the local storage device of the selected node, tasking the selected node to run the upcoming future workload on the selected node at the predicted start time of the upcoming future workload.

3. The computer-implemented method of claim 2, further comprising:
   upon confirming the image file for the upcoming future workload is not locally stored by the local storage device of the second node, comparing, by the processor, available space of the local storage device with image size of the image file for deploying the upcoming future workload;
   upon comparing the available space of the local storage device with the image size of the image file, finding that the image size exceeds the available space of the local storage device:
      triggering, by the processor, a disk utilization process; and
   upon comparing the available space of the local storage device with the image size of the image file, finding that the image size is less that the available space on the local storage device:
      pulling, by the processor, the image file from a registry; and
      storing, by the processor, the image file to the local storage device.

4. The computer-implemented method of claim 3, wherein finding that the image size is less that the available space on the local storage device further comprises:
   determining, by the processor, network input/output (I/O) of the selected node satisfies network I/O requirements of the upcoming future workload.

5. The computer-implemented method of claim 3, wherein the disk utilization process comprises:
   setting, by the processor, a target amount of free space on the local storage device that meets or exceeds the image size;
   mapping, by the processor, a relationship between existing image files stored on the local storage device and related workloads predicted to be scheduled to be run at a future point in time;
   ordering, by the processor, the existing image files by predicted start times of related workloads, wherein earliest start time is ordered first, and latest start time is last;
   while the available space on the local storage device is less than or equal to the target amount of free space, deleting, by the processor, a last image in the ordering of the existing image files until the available space on the local storage device exceeds the target amount of free space on the local storage device; and
   pulling, by the processor, the image file from the registry to the local storage device.

6. The computer-implemented method of claim 1, wherein the image and data requirements are selected from the group consisting of image required, node kind required, number of nodes required, a target deadline, network I/O requirement and a combination thereof.

7. The computer-implemented method of claim 1, wherein the image and data information of the historical workload record are selected from the group consisting of image name, image size, image version, historical workload start time, download time, workload name, workload type, workload running time, kinds of nodes, number of nodes, and a combination thereof.

8. A computing program product for managing and optimizing container image storage comprising:
   one or more computer-readable storage media having computer-readable program instructions stored on the one or more computer-readable storage media, said program instructions executes a computer-implemented method comprising:
      inputting, by a processor, image and data information of a historical workload record into a machine learning model configured to predict future workload requirements based on workload trends of the historical workload record;
      learning, by the processor, image and data requirement trends of the historical workload record using the machine learning model;
      outputting, by the processor, predicted image and data requirements for future workloads based on the image and data requirement trends learned from the machine learning model;
      engaging, by the processor, a checking cycle wherein a daemon process checks whether an image file for an upcoming future workload as predicted by the predicted image and data requirements needs to be downloaded to one or more nodes prior to running the upcoming future workload; and
      triggering, by the processor, a pulling task upon a current local time plus a max recorded download time of the image file plus a pre-defined buffer time is less than or equal to a predicted start time of the upcoming future workload.

9. The computing program product of claim 8, wherein the pulling task comprises:
   selecting, by a processor, a plurality of nodes with properties satisfying image requirements and workload requirements of the upcoming future workload;
   ordering, by the processor, the plurality of nodes with the properties satisfying image requirements and workload requirements by highest availability of one or more computing resources; and
   iteratively checking, by the processor, the plurality of nodes sequentially, starting with a first node in the ordering of the plurality of nodes, for whether a selected node has the image file for the upcoming future workload stored by a local storage device of the selected node, wherein upon confirming the image file for the upcoming future workload is locally stored by the local storage device of the selected node, tasking the selected node to run the upcoming future workload on the selected node at the predicted start time of the upcoming future workload.

10. The computing program product of claim 9, further comprising:
   upon confirming the image file for the upcoming future workload is not locally stored by the local storage device of the second node, comparing, by the processor, available space of the local storage device with image size of the image file for the upcoming future workload;
   upon comparing the available space of the local storage device with the image size of the image file, finding that the image size exceeds the available space of the local storage device:
      triggering, by the processor, a disk utilization process; and
   upon comparing the available space of the local storage device with the image size of the image file, finding that the image size is less that the available space on the local storage device:
      pulling, by the processor, the image file from a registry; and
      storing, by the processor, the image file to the local storage device.

11. The computing program product of claim 10, wherein finding that the image size is less that the available space on the local storage device further comprises:
   determining, by the processor, network input/output (I/O) of the selected node satisfies network I/O requirements of the upcoming future workload.

12. The computing program product of claim 10, wherein the disk utilization process comprises:
   setting, by the processor, a target amount of free space on the local storage device that meets or exceeds the image size;
   mapping, by the processor, a relationship between existing image files stored on the local storage device and related workloads predicted to be scheduled to be run at a future point in time;
   ordering, by the processor, the existing image files by predicted start times of related workloads, wherein earliest start time is ordered first, and latest start time is last;
   while the available space on the local storage device is less than or equal to the target amount of free space, deleting, by the processor, a last image in the ordering of the existing image files until the available space on the local storage device exceeds the target amount of free space on the local storage device; and
   pulling, by the processor, the image file from the registry to the local storage device.

13. The computing program product of claim 8, wherein the image and data requirements are selected from the group consisting of image required, node kind required, number of nodes required, a target deadline, network I/O requirement and a combination thereof.

14. The computing program product of claim 8, wherein the image and data information of the historical workload record are selected from the group consisting of image name, image size, image version, historical workload start time, download time, workload name, workload type, workload running time, kinds of nodes, number of nodes, and a combination thereof.

15. A computer system for managing and optimizing container image storage comprising:
   a processor; and
   a computer-readable storage media coupled to the processor, wherein the computer-readable storage media contains program instructions executing, via the processor, a computer-implemented method comprising:
      inputting, by the processor, image and data information of a historical workload record into a machine learning model configured to predict future workload requirements based on workload trends of the historical workload record;
      learning, by the processor, image and data requirement trends of the historical workload record using the machine learning model;
      outputting, by the processor, predicted image and data requirements for future workloads based on the image and data requirement trends learned from the machine learning model;
      engaging, by the processor, a checking cycle wherein a daemon process checks whether an image file for an upcoming future workload as predicted by the predicted image and data requirements needs to be downloaded to one or more nodes prior to running the upcoming future workload; and
      triggering, by the processor, a pulling task upon a current local time plus a max recorded download time of the image file plus a pre-defined buffer time is less than or equal to a predicted start time of the upcoming future workload.

16. The computer system of claim 15, wherein the pulling task comprises:
   selecting, by a processor, a plurality of nodes with properties satisfying image requirements and workload requirements of the upcoming future workload;
   ordering, by the processor, the plurality of nodes with the properties satisfying image requirements and workload requirements by highest availability of one or more computing resources; and
   iteratively checking, by the processor, the plurality of nodes sequentially, starting with a first node in the ordering of the plurality of nodes, for whether a selected node has the image file for the upcoming future workload stored by a local storage device of the selected node, wherein upon confirming the image file for the upcoming future workload is locally stored by the local storage device of the selected node, tasking the selected node to run the upcoming future workload on the selected node at the predicted start time of the upcoming future workload.

17. The computer system of claim 16, further comprising:
   upon confirming the image file for the upcoming future workload is not locally stored by the local storage device of the second node, comparing, by the processor, available space of the local storage device with image size of the image file for the upcoming future workload;
   upon comparing the available space of the local storage device with the image size of the image file, finding that the image size exceeds the available space of the local storage device:
      triggering, by the processor, a disk utilization process; and
   upon comparing the available space of the local storage device with the image size of the image file, finding that the image size is less that the available space on the local storage device:
      pulling, by the processor, the image file from a registry; and
      storing, by the processor, the image file to the local storage device.

18. The computer system of claim 17, wherein finding that the image size is less that the available space on the local storage device further comprises:
   determining, by the processor, network input/output (I/O) of the selected node satisfies network I/O requirements of the upcoming future workload.

19. The computer system of claim 17, wherein the disk utilization process comprises:
   setting, by the processor, a target amount of free space on the local storage device that meets or exceeds the image size;
   mapping, by the processor, a relationship between existing image files stored on the local storage device and related workloads predicted to be scheduled to be run at a future point in time;
   ordering, by the processor, the existing image files by predicted start times of related workloads, wherein earliest start time is ordered first, and latest start time is last;
   while the available space on the local storage device is less than or equal to the target amount of free space, deleting, by the processor, a last image in the ordering of the existing image files until the available space on the local storage device exceeds the target amount of free space on the local storage device; and pulling, by the processor, the image file from the registry to the local storage device.

20. The computer system of claim 15, wherein the image and data requirements are selected from the group consisting of image required, node kind required, number of nodes required, a target deadline, network I/O requirement and a combination thereof.

* * * * *